(12) United States Patent
Lan

(10) Patent No.: US 11,173,092 B2
(45) Date of Patent: Nov. 16, 2021

(54) JOINT EXOSKELETON AUXILIARY DRIVING MECHANISM

(71) Applicant: NATIONAL CHENG KUNG UNIVERSITY, Tainan (TW)

(72) Inventor: Chao-Chieh Lan, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 651 days.

(21) Appl. No.: 16/111,452

(22) Filed: Aug. 24, 2018

(65) Prior Publication Data

US 2019/0336382 A1 Nov. 7, 2019

(30) Foreign Application Priority Data

May 4, 2018 (TW) .................................. 107115324

(51) Int. Cl.
*A61H 1/02* (2006.01)
*A61H 3/00* (2006.01)
*F16H 25/20* (2006.01)
*F16H 21/54* (2006.01)
(Continued)

(52) U.S. Cl.
CPC ............. *A61H 3/00* (2013.01); *A61H 1/0266* (2013.01); *A61H 1/0277* (2013.01); *A61H 1/0285* (2013.01); *B25J 9/0006* (2013.01); *F16H 19/001* (2013.01); *F16H 21/54* (2013.01); *F16H 25/2015* (2013.01); *A61H 2201/1215* (2013.01); *A61H 2201/149* (2013.01); *A61H 2201/165* (2013.01); *A61H 2201/1659* (2013.01); *A61H 2201/5069* (2013.01); *F16H 2025/204* (2013.01); *F16H 2025/2043* (2013.01);
(Continued)

(58) Field of Classification Search
CPC .. A61H 1/0266; A61H 1/0274; A61H 1/0277; A61H 1/0281; A61H 1/0285; A61H 2001/0203; A61H 2001/0207; A61H 2001/1635; A61H 2001/1638; A61H 2001/165; A61H 2001/1673; A61H 2205/065; A61H 3/00
See application file for complete search history.

(56) References Cited

U.S. PATENT DOCUMENTS 5,355,743 A * 10/1994 Tesar .......................... B25J 9/08
475/149
9,157,485 B2 * 10/2015 Pane ..................... B25J 17/0241
(Continued)

*Primary Examiner* — LaToya M Louis
(74) *Attorney, Agent, or Firm* — Tracy M. Heims; Apex Juris, pllc.

(57) ABSTRACT

A joint exoskeleton auxiliary driving mechanism has a first driving module. The first driving module has a first gear member, a first connecting member, a first rotating driver, a first linear driver, and a first motion element. The first connecting member is disposed on a side of the first gear member. The first rotating driver is disposed on the first connecting member and engages with the first gear member. The first linear driver is disposed on the first connecting member. The first motion assembly is connected to a first power output element of the first linear driver. The joint exoskeleton auxiliary driving mechanism has two degrees of freedom motion function such as forward rotation, reverse rotation, and dorsiflexion or extension, and has the advantages of structural simplification, precise strength controlling, lightweight, and miniaturization.

17 Claims, 13 Drawing Sheets

(51) Int. Cl.
*B25J 9/00* (2006.01)
*F16H 19/00* (2006.01)

(52) U.S. Cl.
CPC ............ *F16H 2025/2068* (2013.01); *F16H 2025/2081* (2013.01); *F16H 2025/2096* (2013.01)

(56) References Cited

U.S. PATENT DOCUMENTS

| | | | | |
|---|---|---|---|---|
| 2008/0075561 | A1* | 3/2008 | Takemura | F16F 1/025 414/2 |
| 2010/0204804 | A1* | 8/2010 | Garrec | B25J 9/0006 623/24 |
| 2011/0260380 | A1* | 10/2011 | Hollander | F16F 1/125 267/175 |
| 2012/0004581 | A1* | 1/2012 | Dinon | A61H 1/0255 601/23 |
| 2018/0021941 | A1* | 1/2018 | Berger | B25J 19/0016 180/21 |
| 2019/0145504 | A1* | 5/2019 | Lan | G01L 1/042 74/89.23 |

\* cited by examiner

JOINT EXOSKELETON AUXILIARY DRIVING MECHANISM

BACKGROUND OF THE INVENTION

1. Field of the Invention

The present invention relates to a joint exoskeleton auxiliary driving mechanism, and more particularly to a joint exoskeleton auxiliary driving mechanism that is applied to assist the joint rehabilitations about the elbow joint, the wrist joint, the knee joint, and the ankle joint.

2. Description of Related Art

Action flexibility, lightweight, and miniaturization are the main considerations for inventions of human joint rehabilitation driving mechanisms, rehabilitation robots, humanoid robots, and prosthetic robots. Action demands for the applied joint parts are needed for consideration, too.

Take a conventional joint auxiliary driving mechanism for example. The conventional joint auxiliary driving mechanism is suitable to the outside of a joint in a human for rehabilitating. The conventional joint auxiliary driving mechanism is made by a driving motor, an arc slide, and a connecting assembly for having two or three degrees of freedom.

However, the conventional joint auxiliary driving mechanism is limited by a mechanism linkage and is hard to satisfy the requirements for the joint space motion. Components used in the conventional joint auxiliary driving mechanism are manufactured according to particular specifications. The manufacturing cost, the weight, and the occupied space of the conventional joint auxiliary driving mechanism are increased. It is a heavy burden for patients using the conventional joint auxiliary driving mechanism. For a robot, the conventional joint auxiliary driving mechanism is difficult to apply.

To overcome the shortcomings, the present invention provides a joint exoskeleton auxiliary driving mechanism to mitigate or obviate the aforementioned problems.

SUMMARY OF THE INVENTION

The objective of the invention is to provide a joint exoskeleton auxiliary driving mechanism that may solve the problems that the conventional joint auxiliary driving mechanism is hard to satisfy the requirements for the joint space motion, and the manufacturing cost, the weight, and the occupied space of the conventional joint auxiliary driving mechanism are increased.

The joint exoskeleton auxiliary driving mechanism has a first driving module. The first driving module has a first gear member, a first connecting member, a first rotating driver, a first linear driver, and a first motion element.

The first gear member has a side, a first gear ring, and a first center axis defined in the first gear ring. The first gear ring has a first outer surface and a first engaging portion. The first outer surface is formed around the first gear ring. The first engaging portion is formed on at least part of the first outer surface.

The first connecting member is disposed on the side of the first gear member. The first connecting member is able to rotate relative to the first center axis of the first gear member.

The first rotating driver is disposed on the first connecting member and has a first rotating driving motor assembly and a first driving gear. The first rotating motor assembly has a first driving rod. The first driving gear is disposed around the first driving rod and engages with the first engaging portion of the first gear ring.

The first linear driver is disposed on the first connecting member and has a first driving motor and a first linear driving assembly. The first driving motor is disposed on the first connecting member and is connected to the first linear driving assembly. The first linear driving assembly has a first power output axial direction and a first power output element. The first power output axial direction is defined in the first linear driving assembly. The first power output element is able to move along the first power output axial direction.

The first motion assembly is connected to the first power output element of the first linear driver.

The joint exoskeleton auxiliary driving mechanism in accordance with the present invention has the following advantages:

1. Structural simplification and precise strength controlling: the first gear member engages with the first rotating driver. The first linear driver is connected to the first motion assembly. The first rotating driver and the first linear driver are disposed on the first connecting member side by side. Structure of the joint exoskeleton auxiliary driving mechanism is simple. Cost of the joint exoskeleton auxiliary driving mechanism is low. Strength of the joint exoskeleton auxiliary driving mechanism can be controlled precisely. The joint exoskeleton auxiliary driving mechanism has two degrees of freedom motion function such as forward rotation, reverse rotation, and dorsiflexion or extension.

2. Lightweight and miniaturization: the joint exoskeleton auxiliary driving mechanism has a compact spatial configuration and therefore a miniaturization characteristic. Components of the joint exoskeleton auxiliary driving mechanism can be decreased for simplifying the structure toward lightweight.

3. Applicable to joint rehabilitation for a human body or a robot joint driving apparatus: the first gear member engages with the first rotating driver. The first linear driver is connected to the first connecting member and the first motion assembly. The joint exoskeleton auxiliary driving mechanism has two degrees of freedom motion function such as forward rotation, reverse rotation, and dorsiflexion or extension. The joint exoskeleton auxiliary driving mechanism is applied to joint rehabilitation for a human body or a robot joint driving apparatus for providing a good driving basis to ensure the cooperation security.

The joint exoskeleton auxiliary driving mechanism further has a displacement sensor. The displacement sensor is disposed on a side of the first elasticity element for sensing a deformation of the first elasticity element to convert an output force. Furthermore, the joint exoskeleton auxiliary driving mechanism has a first torsion spring and a first angle sensor. The first torsion spring is connected between the first driving rod and the first driving gear of the first rotating driving motor assembly. The first angle sensor is disposed beside the first driving gear for sensing a rotating deformation of the first driving gear to convert an output torque of the first rotating driver for controlling strength precisely.

The joint exoskeleton auxiliary driving mechanism has a second linear driver. The second linear is disposed on the first connecting member and has a second driving motor and a second linear driving assembly. The second driving motor is disposed on the first connecting member. The second linear driving assembly is connected to the second driving motor and has a second power output element. The second power output element is able to move along the first power output axial direction and is connected to the first motion assembly. The second linear driver is disposed on the first connecting member. The joint exoskeleton auxiliary driving mechanism has three degrees of freedom motion function such as ulnar deviation or radial deviation, dorsiflexion or extension, and pronation or supination. The joint exoskeleton auxiliary driving mechanism can be applied to multi-directional motion joint parts such as a wrist joint and ankle joint in a human body, rehabilitation robot, humanoid robot, or prosthetic robot. Action flexibility of the joint exoskeleton auxiliary driving mechanism is good.

The joint exoskeleton auxiliary driving mechanism has a second driving module, and the second driving module has a second gear member, a second connecting member, a second rotating driver, a second linear driver, a third linear driver, and a second motion assembly.

The second gear member is connected to the first motion assembly of the first driving module and has a side, a second gear ring, and a second center axis defined in the second gear ring. The second gear ring is connected to another end of the first motion assembly relative to the first power output element. The second gear ring has a second outer surface and a second engaging portion. The second outer surface is formed around the second gear ring. The second engaging portion is formed on at least part of the second outer surface.

The second connecting member is disposed on the side of the second gear member. The second connecting member is able to rotate relative to the second center axis of the second gear member.

The second rotating driver is disposed on the second connecting member and has a second rotating driving motor assembly and a second driving gear. The second rotating motor assembly has a second driving rod. The second driving gear is disposed around the second driving rod and engages with the second engaging portion of the second gear ring.

The second linear driver is disposed on the second connecting member and has a second driving motor and a second linear driving assembly. The second driving motor is disposed on the second connecting member and is connected to the second linear driving assembly. The second linear driving assembly has a second power output axial direction and a second power output element. The second power output axial direction is defined in the second linear driving assembly. The second power output element is able to move along the second power output axial direction.

The third linear driver is disposed on the second connecting member and has a third driving motor and a third linear driving assembly. The third driving motor is disposed on the second connecting member and is connected to the third linear driving assembly. The third linear driving assembly has a third power output element. The third power output element is able to move along the second power output axial direction.

The second motion assembly is connected to the second power output element of the second linear driver and the third power output element of the third linear driver.

The first driving module of the joint exoskeleton auxiliary driving mechanism has two degrees of freedom such as outer rotation or inner rotation, and dorsiflexion or extension. The second driving module has three degrees of freedom such as ulnar deviation or radial deviation, dorsiflexion or extension, and pronation or supination. The first driving module is connected to the second driving module in series to form a driving mechanism having five degrees of freedom. The joint exoskeleton auxiliary driving mechanism can be applied to a double joint portion between the elbow joint and the wrist joint or between the knee joint and the ankle joint in a human body, rehabilitation robot, humanoid robot, or prosthetic robot. Furthermore, the first driving module and the second driving module both have a compact spatial configuration for decreasing size, decreasing weight, and increasing the action flexibility.

The joint exoskeleton auxiliary driving mechanism further has a displacement sensor. The displacement sensor is disposed on a side of the first elasticity element for sensing a deformation of the first elasticity element to convert an output force. Furthermore, the joint exoskeleton auxiliary driving mechanism has a first torsion spring and a first angle sensor. The first torsion spring is connected between the first driving rod and the first driving gear of the first rotating driving motor assembly. The first angle sensor is disposed beside the first driving gear for sensing a rotating deformation of the first driving gear to convert an output torque. The joint exoskeleton auxiliary driving mechanism has a second torsion spring and a second angle sensor. The second torsion spring is connected between the second driving rod and the second driving gear of the second rotating driving motor assembly. The second angle sensor is disposed beside the second driving gear for sensing a rotating deformation of the second driving gear to convert an output torque of the second rotating driver. The first angle sensor and the second angle sensor can respectively sense the rotating deformation of the first driving gear and the rotating deformation of the second driving gear for converting the output torque of the first rotating driver and the output torque of the second rotating driver to control strength precisely.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
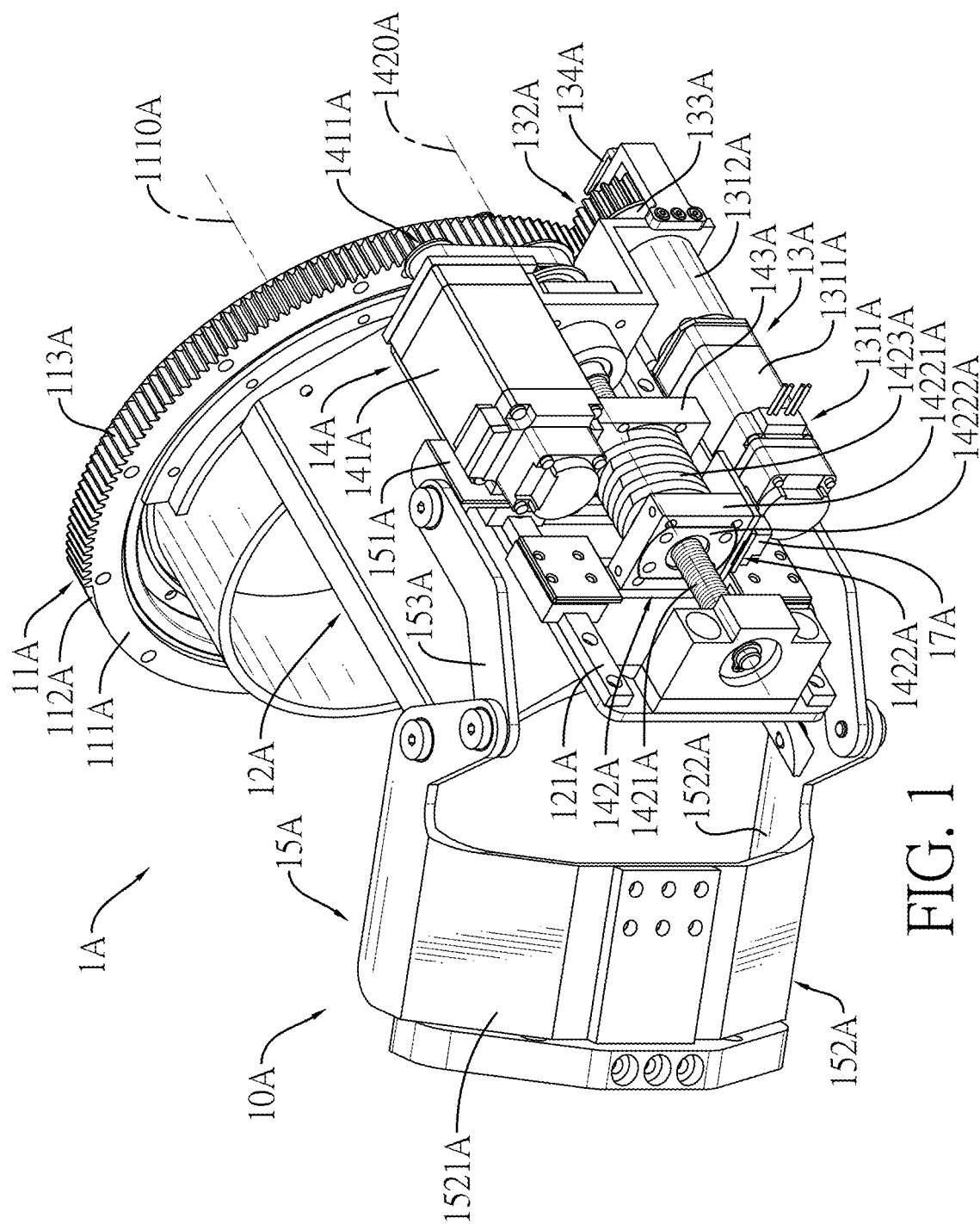
FIG. 1 is a perspective view of a first embodiment of a joint exoskeleton auxiliary driving mechanism in accordance with the present invention.
Figure 5:
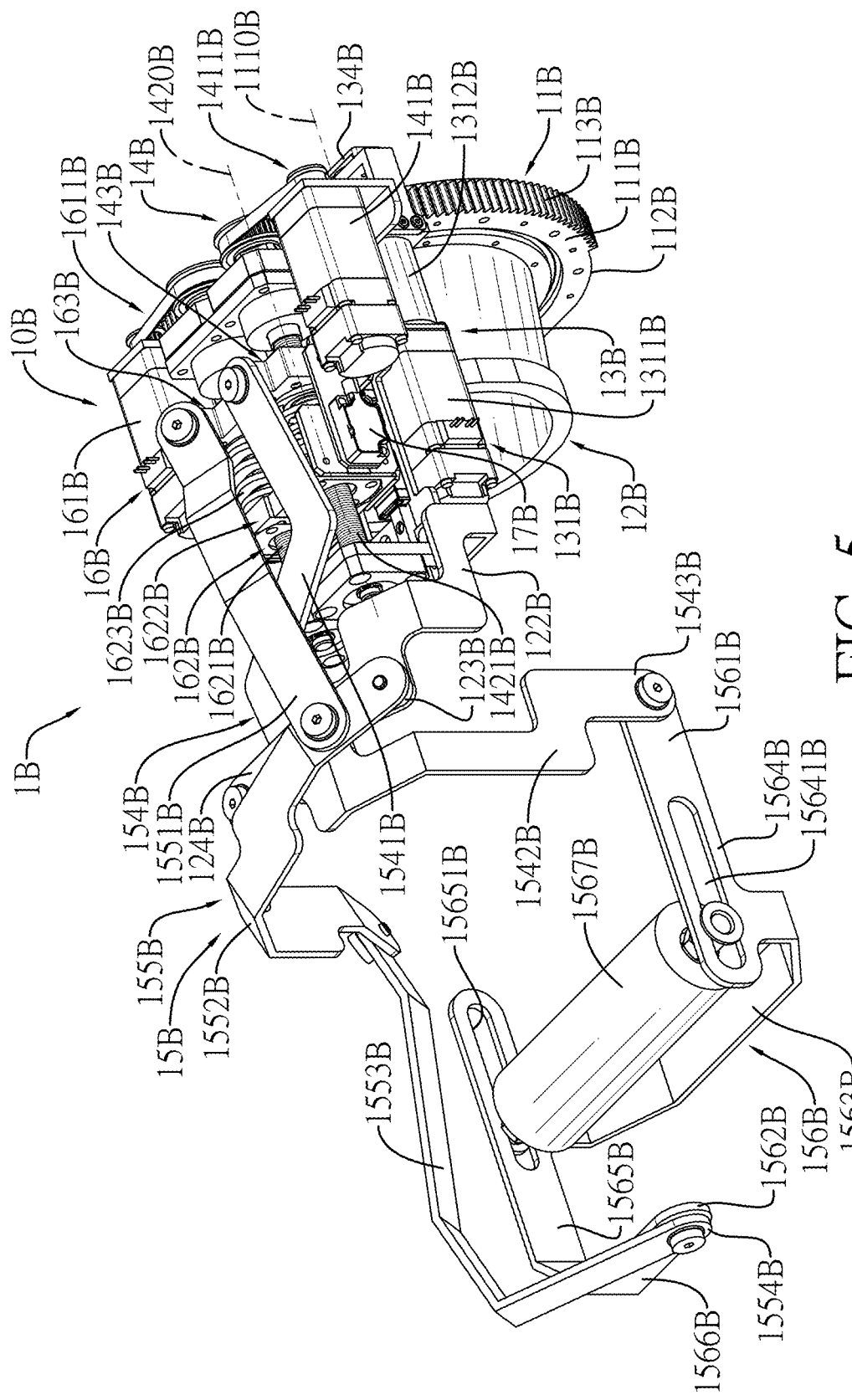
FIG. 5 is a perspective view of a second embodiment of a joint exoskeleton auxiliary driving mechanism in accordance with the present invention.
Figure 9:
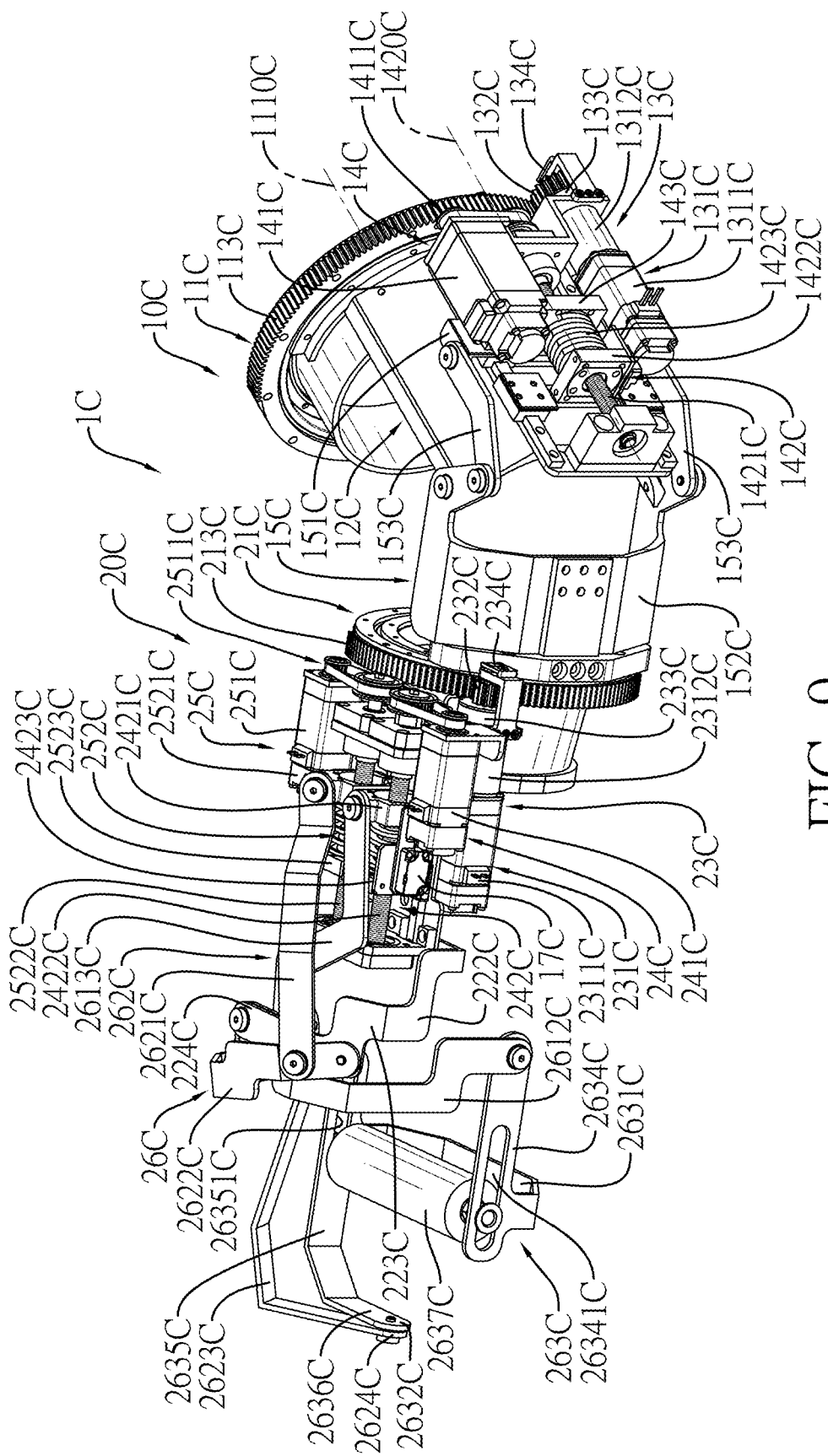
FIG. 9 is a perspective view of a third embodiment of a joint exoskeleton auxiliary driving mechanism in accordance with the present invention.

With reference to FIGS. 1, 5, and 9, a joint exoskeleton auxiliary driving mechanism has multiple embodiments described as follows.

Figure 2:
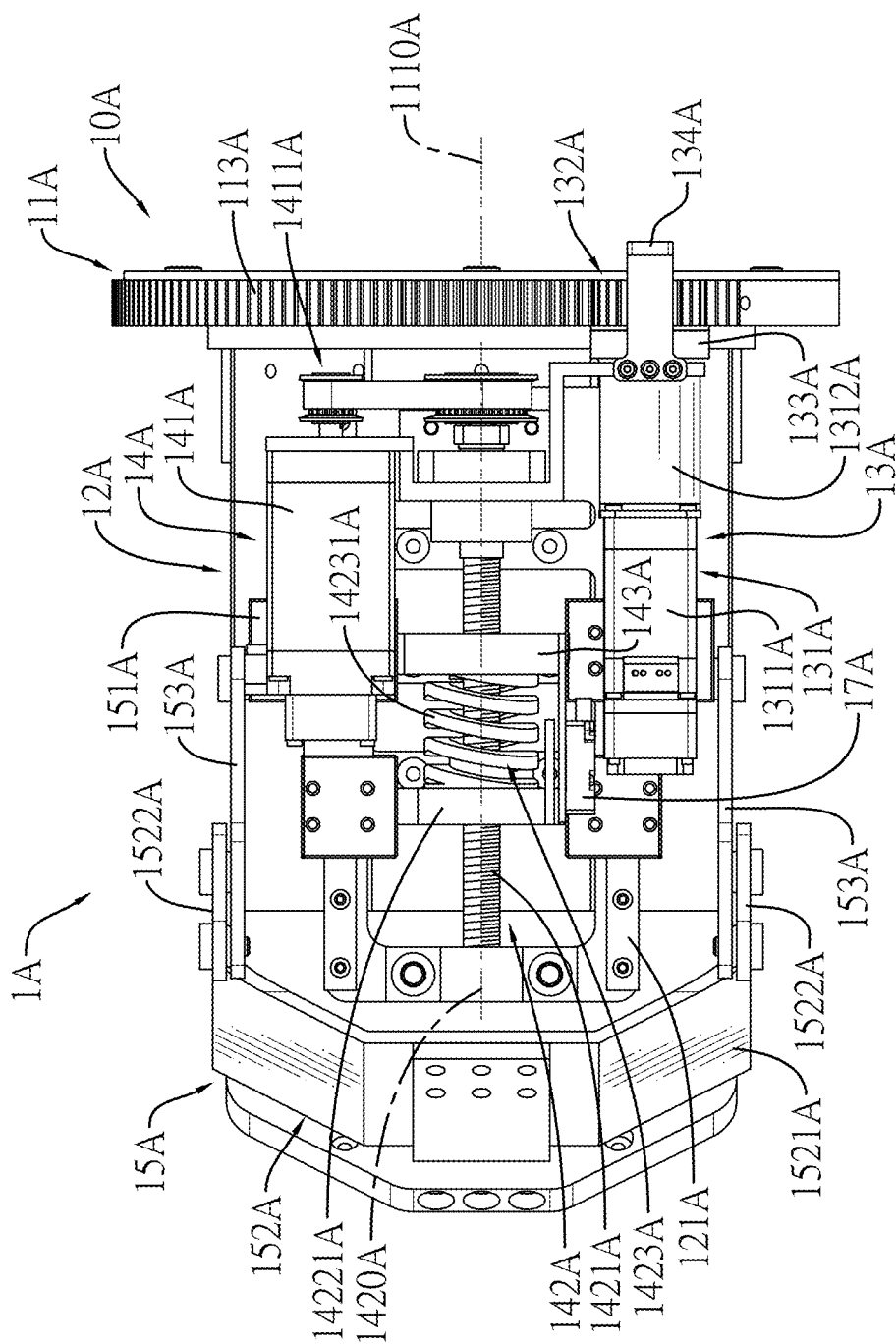
FIG. 2 is a side view of the joint exoskeleton auxiliary driving mechanism in FIG. 1.
Figure 3:
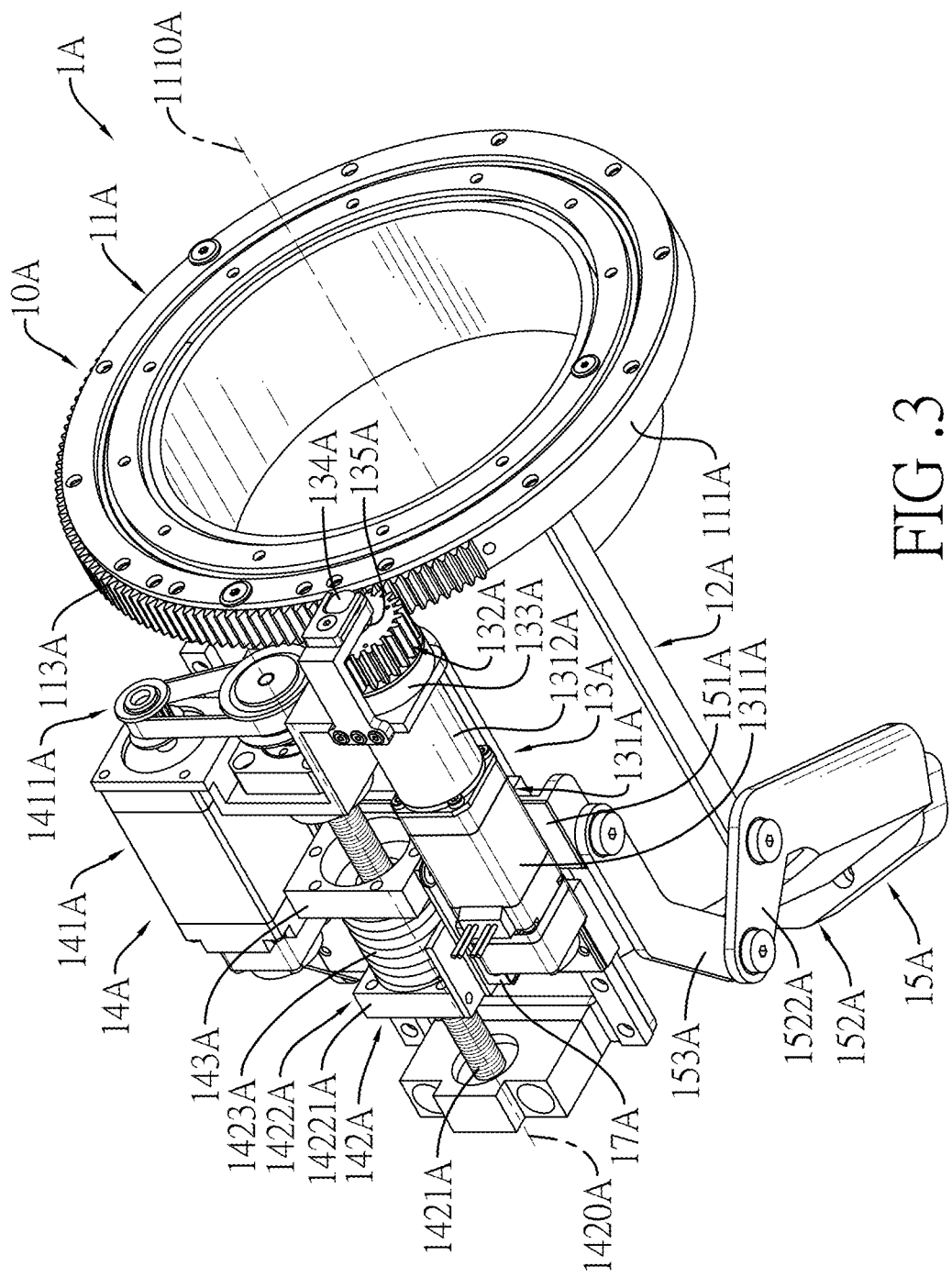
FIG. 3 is another perspective view of the joint exoskeleton auxiliary driving mechanism in FIG. 1.

With reference to FIGS. 1 to 3, in a first embodiment of the joint exoskeleton auxiliary driving mechanism 1A in accordance with the present invention, the joint exoskeleton auxiliary driving mechanism 1A has two degrees of freedom and is applied to a portion such as an elbow joint or a knee joint in a human body, rehabilitation robot, humanoid robot, or prosthetic robot. The joint exoskeleton auxiliary driving mechanism 1A is a driving mechanism for providing an auxiliary driving force. The joint exoskeleton auxiliary driving mechanism 1A has a first driving module 10A. The first driving module 10A has a first gear member 11A, a first connecting member 12A, a first rotating driver 13A, a first linear driver 14A, and a first motion assembly 15A.

With reference to FIGS. 1 to 3, the first gear member 11A has a side, a first gear ring 111A, and a first center axis 1110A defined in the first gear ring 111A. The first gear ring 111A has a first outer surface 112A and a first engaging portion 113A. The first outer surface 112A is formed around the first gear ring 111A. The first engaging portion 113A is formed on at least part of the first outer surface 112A. The first engaging portion 113A has multiple continuous engaging teeth. The first engaging portion 113A is disposed on the first outer surface 112A of the first gear ring 111A according to a rotating angle of a joint portion in use. Taking an application to an elbow joint for example, a central angle of a distribution range of the continuous engaging teeth relative to the first center axis 1110A is about ±75 degrees.

The first connecting member 12A is disposed on the side of the first gear member 11A. The first connecting member 12A is able to rotate relative to the first center axis 1110A of the first gear member 11A. The first connecting member 12A has at least one first slide rail 121A. The at least one first slide rail 121A is disposed along a first power output axial direction 1420A. The first power output axial direction 1420A and the first center axis 1110A are parallel to each other.

The first rotating driver 13A is disposed on the first connecting member 12A. The first rotating driver 13A has a first rotating driving motor assembly 131A and a first driving gear 132A. The first rotating driving motor assembly 131A has a driving motor 1311A and a deceleration gear set 1312A connected to a power output end of the driving motor 1311A. The driving motor 1311A may use a rotating stepper motor. The rotating stepper motor has advantages of lightweight, high torque density, and high part reliability. The first rotating motor assembly 131A has a first driving rod 135A. The first driving gear 132A is disposed around the first driving rod 135A and engages with the first engaging portion 113A of the first gear ring 111A.

With reference to FIGS. 1 to 3, the joint exoskeleton auxiliary driving mechanism 1A has a first torsion spring 133A and a first angle sensor 134A. The first torsion spring 133A is connected between the first driving rod 135A and the first driving gear 132A of the first rotating driving motor assembly 131A. The first angle sensor 134A is disposed beside the first driving gear 132A for sensing a rotating deformation of the first driving gear 132A to convert an output torque of the first rotating driver 13A.

The first linear driver 14A is disposed on the first connecting member 12A. The first linear driver 14A has a first driving motor 141A and a first linear driving assembly 142A. The first driving motor 141A may use a rotating stepper motor having advantages of lightweight, high torque density, and high part reliability. The first driving motor 141A is disposed on the first connecting member 12A and is connected to the first linear driving assembly 142A. The first linear driving assembly 142A has the first power output axial direction 1420A and a first power output element 143A. The first power output axial direction 1420A is defined in the first linear driving assembly 142A. The first power output element 143A is able to move along the first power output axial direction 1420A. The first power output axial direction 1420A and the first center axis 1110A are parallel with each other.

The first linear driving assembly 142A has a first screw 1421A, a first driven element 1422A, and a first elasticity element 1423A. The first screw 1421A is rotatably disposed on the first connecting member 12A along the first power output axial direction 1420A and is inserted through the first power output element 143A. The first driven element 1422A has a first driven block 14221A and a first screw bushing 14222A. The first driven block 14221A is rotatably disposed on the first connecting member 12A along the first power output axial direction 1420A. The first screw bushing 14222A is disposed on the first driven block 14221A and is disposed around and engages with the first screw 1421A. The first elasticity element 1423A has a first spring 14231A. Two ends of the first spring 14231A are respectively connected to the first driven element 1422A and the first power output element 143A. The first driving motor 141A is connected to the first screw 1421A by a first wheel train transmission assembly 1411A. The first wheel train transmission assembly 1411A may use a pulley set.

With reference to FIGS. 1 to 3, the first connecting member 12A has at least one first slide rail 121A. The at least one first slide rail 121A is disposed along the first power output axial direction 1420A. The first driven block 14221A and the first power output element 143A are respectively and slidably disposed on the at least one first slide rail 121A.

In the first embodiment of the joint exoskeleton auxiliary driving mechanism 1A, the joint exoskeleton auxiliary driving mechanism 1A has a displacement sensor 17A. The displacement sensor 17A is disposed on a side of the first elasticity element 1423A for sensing a deformation of the first elasticity element 1423A to convert an output force.

The first motion assembly 15A is connected to the first power output element 143A of the first linear driver 14A. The first motion assembly 15A has a first motion element 151A, a second motion element 152A, and two first connecting rods 153A. The first motion element 151A is disposed on the first connecting member 12A and is able to move along the first power output axial direction 1420A. The second motion element 152A has a body 1521A and two connecting wings 1522A. The two connecting wings 1522A are disposed on an end of the body 1521A facing the first motion element 151A. The two connecting wings 1522A are coaxially and pivotally disposed on the first connecting member 12A. In each first connecting rod 153A, one end of the first connecting rod 153A is pivotally disposed on a side of the first motion element 151A relative to the first power output axial direction 1420A. Another end of the first connecting rod 153A is pivotally disposed on a distal end of one of the two connecting wings 1522A opposite to the body 1521A.

Figure 4:
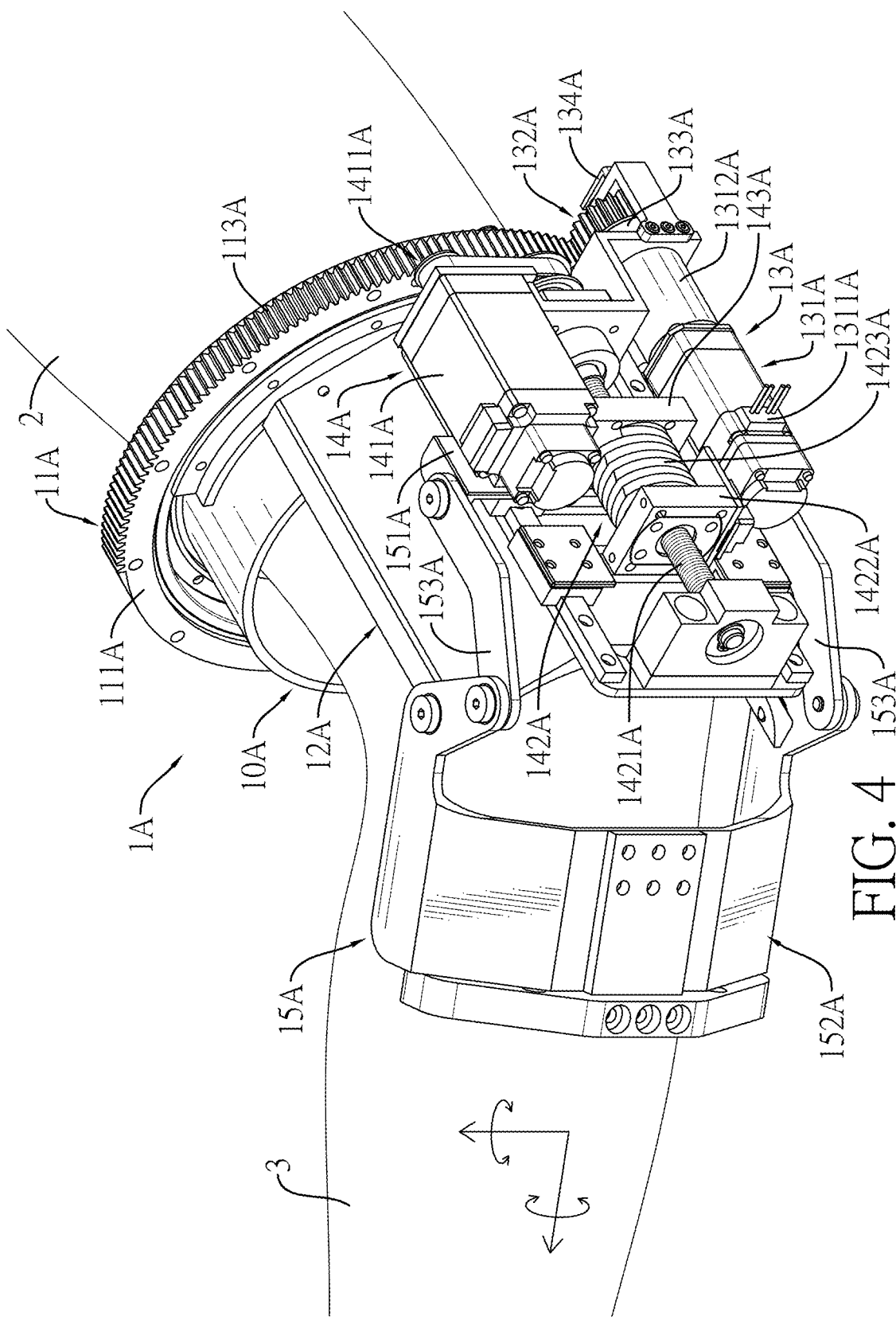
FIG. 4 is an operational perspective view of the joint exoskeleton auxiliary driving mechanism in FIG. 1, showing the joint exoskeleton auxiliary driving mechanism is applied to an elbow joint.

With reference to FIG. 4, the joint exoskeleton auxiliary driving mechanism 1A is applied to the elbow joint of the human body. The first connecting member 12A is disposed on an upper arm 2 of the human body. The first motion assembly 15A is connected to a forearm 3 of the human body. The first gear member 11A engages with the first rotating driver 13A for driving the forearm 3 connected to the elbow joint to perform an outer rotation and an inner rotation. The first linear driver 14A and the first motion assembly 15A are connected to each other and are disposed on the first connecting member 12A for driving the forearm 3 connected to the elbow joint to perform a dorsiflexion and an extension.

With reference to FIGS. 1 to 4, the first motion assembly 15A combines the first motion element 151A, the second motion element 152A, and the two first connecting rods 153A for increasing the action flexibility of the elbow joint. The displacement sensor 17A can sense the deformation of the first elasticity element 1423A of the first linear driver 14A to convert the output force. The first torsion spring 133A is connected between the first driving rod 135A and the first driving gear 132A of the first rotating driving motor assembly 131A. The first angle sensor 134A can sense the rotating deformation of the first driving gear 132A to convert the output torque of the first rotating driver 13A. Strength of the joint exoskeleton auxiliary driving mechanism 1A can be controlled precisely.

In the first embodiment of the joint exoskeleton auxiliary driving mechanism 1A, the first gear member 11A engages with the first rotating driver 13A. The first linear driver 14A is connected to the first connecting member 12A and a first motion assembly 15A. Structure of the joint exoskeleton auxiliary driving mechanism 1A is simplified for controlling the strength precisely to achieve two degrees of freedom motion function such as dorsiflexion or extension, and forward rotation or reverse rotation. The motion function of the joint exoskeleton auxiliary driving mechanism 1A is good for the rehabilitation of the elbow joint of the human body. For the same reason, the joint exoskeleton auxiliary driving mechanism 1A can be applied to the knee joint of the human body for rehabilitating. The joint exoskeleton auxiliary driving mechanism 1A also can be applied to the elbow joint or the knee joint in a humanoid robot, rehabilitation robot, or prosthetic robot for providing the auxiliary driving force. The joint exoskeleton auxiliary driving mechanism 1A can provide a good driving basis to ensure the cooperation security.

Figure 6:
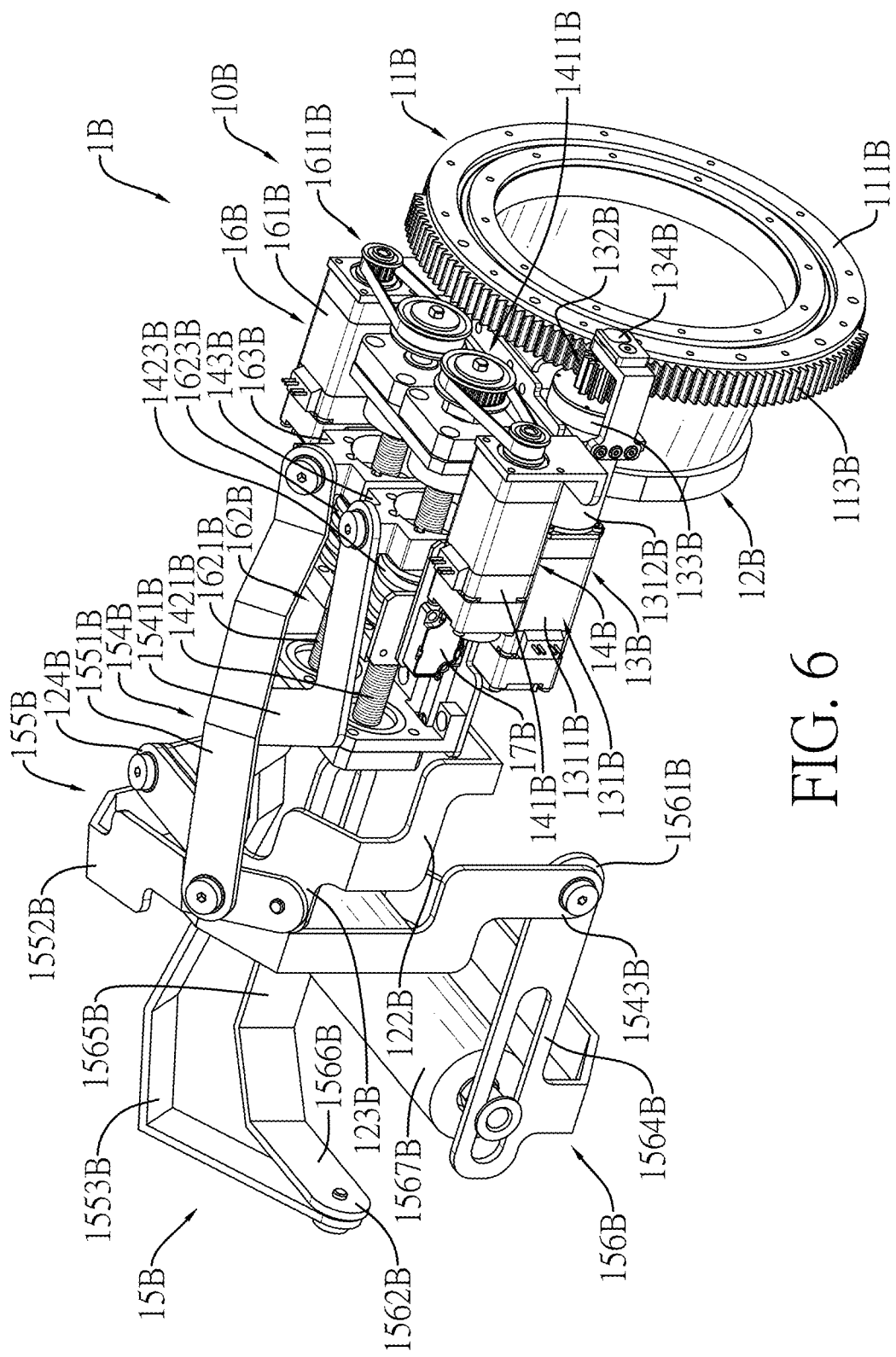
FIG. 6 is another perspective view of the joint exoskeleton auxiliary driving mechanism in FIG. 5.
Figure 7:
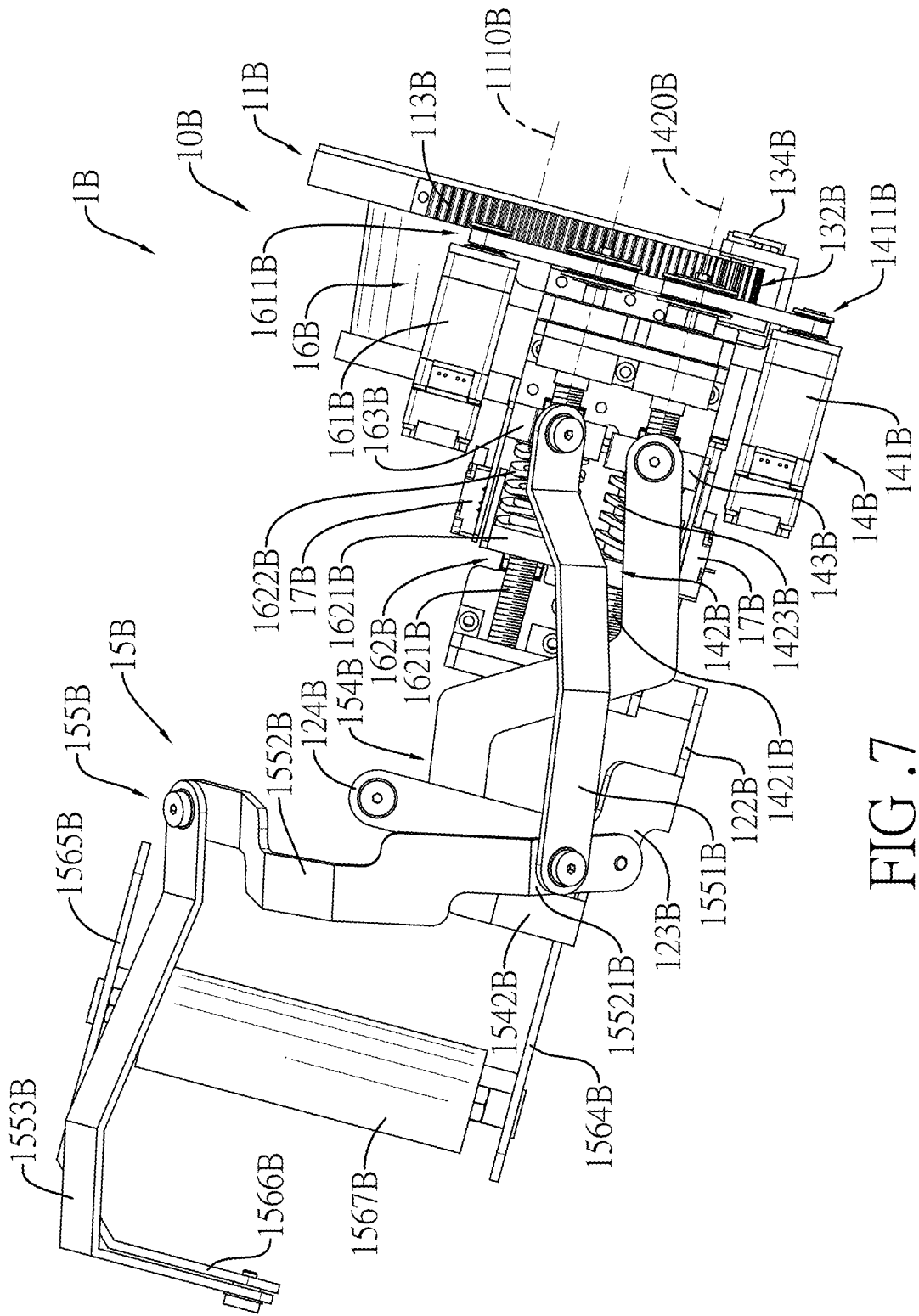
FIG. 7 is a top side view of the joint exoskeleton auxiliary driving mechanism in FIG. 5.

With reference to FIGS. 5 to 7, in a second embodiment of the joint exoskeleton auxiliary driving mechanism 1B in accordance with the present invention, the joint exoskeleton auxiliary driving mechanism 1B has three degrees of freedom and is applied to a portion such as a wrist joint or an ankle joint in a human body, humanoid robot, rehabilitation robot, or prosthetic robot. The joint exoskeleton auxiliary driving mechanism 1B is a driving mechanism for providing an auxiliary driving force. The joint exoskeleton auxiliary driving mechanism 1B has a first driving module 10B. The first driving module 10B has a first gear member 11B, a first connecting member 12B, a first rotating driver 13B, a first linear driver 14B, a first motion assembly 15B, and a second linear driver 16B.

In the second embodiment of the joint exoskeleton auxiliary driving mechanism 1B, structures of the first gear member 11B, the first connecting member 12B, the first rotating driver 13B, the first linear driver 14B, and the first motion assembly 15B of the first driving module 10B are mostly similar to structures of the first gear member 11A, the first connecting member 12 A, the first rotating driver 13 A, the first linear driver 14 A, and the first motion assembly 15 A of the first driving module 10 A shown in the first embodiment of the joint exoskeleton auxiliary driving mechanism 1A. In the second embodiment of the joint exoskeleton auxiliary driving mechanism 1B, the joint exoskeleton auxiliary driving mechanism 1B further has the second linear driver 16B. Therefore, the joint exoskeleton auxiliary driving mechanism 1B has three degrees of freedom more than the two degrees of freedom shown in the first embodiment of the joint exoskeleton auxiliary driving mechanism 1A.

With reference to FIGS. 5 to 7, the first gear member 11B has a side, a first gear ring 111B, and a first center axis 1110B defined in the first gear ring 111 B. The first gear ring 111B has a first outer surface 112B and a first engaging portion 113B. The first outer surface 112B is formed around the first gear ring 111B. The first engaging portion 113B is formed on at least part of the first outer surface 112B.

The first connecting member 12B is disposed on the side of the first gear member 11B. The first connecting member 12B is able to rotate relative to the first center axis 1110B of the first gear member 11B.

The first rotating driver 13B is disposed on the first connecting member 12B. The first rotating driver 13B has a first rotating driving motor assembly 131B and a first driving gear 132B. The first rotating driving motor assembly 131B has a driving motor 1311B and a deceleration gear set 1312B connected to a power output end of the driving motor 1311B. The driving motor 1311B may use a rotating stepper motor. The rotating stepper motor has advantages of lightweight, high torque density, and high part reliability. The first rotating motor assembly 131B has a first driving rod 135B. The first driving gear 132B is disposed around the first driving rod and engages with the first engaging portion 113B of the first gear ring 111B.

With reference to FIGS. 5 to 7, the joint exoskeleton auxiliary driving mechanism 1B has a first torsion spring 133B and a first angle sensor 134B. The first torsion spring 133B is connected between the first driving rod and the first driving gear 132B of the first rotating driving motor assembly 131B. The first angle sensor 134B is disposed beside the first driving gear 132B for sensing a rotating deformation of the first driving gear 132B to convert an output torque of the first rotating driver 13B.

The first linear driver 14B is disposed on the first connecting member 12B. The first linear driver 14B has a first driving motor 141B and a first linear driving assembly 142B. The first driving motor 141B may use a rotating stepper motor having advantages of lightweight, high torque density, and high part reliability. The first driving motor 141B is disposed on the first connecting member 12B and is connected to the first linear driving assembly 142B. The first linear driving assembly 142B has the first power output axial direction 1420B and a first power output element 143B. The first power output axial direction 1420B is defined in the first linear driving assembly 142B. The first power output element 143B is able to move along the first power output axial direction 1420B.

The second linear driver 16B is disposed on the first connecting member 12B and has a second driving motor 161B and a second linear driving assembly 162B. The second driving motor 161B may use a rotating stepper motor having advantages of lightweight, high torque density, and high part reliability. The second driving motor 161B is disposed on the first connecting member 12B. The second linear driving assembly 162B is connected to the second driving motor 161B and has a second power output element 163B. The second power output element 163B is able to move along the first power output axial direction 1420B and is connected to the first motion assembly 15B.

The first linear driving assembly 142B has a first screw 1421B, a first driven element 1422B, and a first elasticity element 1423B. The first screw 1421B is rotatably disposed on the first connecting member 12B along the first power output axial direction 1420B and is inserted through the first power output element 143B. The first driven element 1422B has a first driven block 14221B and a first screw bushing 14222B. The first driven block 14221B is disposed on the first connecting member 12B for moving along the first power output axial direction 1420B. The first screw bushing 14222B is disposed in the first driven block 14221B and is disposed around the first screw 1421B. The first elasticity element 1423B has a first spring. Two ends of the first spring are respectively connected to the first driven element 1422B and the first power output element 143B. The first driving motor 141B is connected to the first screw 1421B by a first wheel train transmission assembly 1411B.

The second linear driving assembly 162B has a second screw 1621B, a second driven element 1622B, and a second elasticity element 1623B. The second screw 1621B is rotatably disposed on the first connecting member 12B along the first power output axial direction 1420B and is inserted through a second power output element 163B. The second driven element 1622B has a second driven block 16221B and a second screw bushing 16222B. The second driven block 16221B is disposed on the first connecting member 12B for moving along the first power output axial direction 1420B. The second screw bushing 16222B is disposed in the second driven block 16221B and is disposed around the second screw 1621B. The second elasticity element 1623B has a second spring. Two ends of the second spring are respectively connected to the second driven element 1622B and the second power output element 163B. The second driving motor 161B is connected to the second screw 1621B by a second wheel train transmission assembly 1611B.

The first connecting member 12B has at least one first slide rail 121B. The at least one first slide rail 121B is disposed along the first power output axial direction 1420B. The first driven block 14221B, the first power output element 143B, the second driven block 16221B, and the second power output element 163B are respectively and slidably disposed on the at least one first slide rail 121B.

With reference to FIGS. 5 to 7, the joint exoskeleton auxiliary driving mechanism 1B has two displacement sensors 17B. The displacement sensors 17B are respectively disposed on a side of the first elasticity element 1423B and a side of the second elasticity element 1623B for sensing a deformation of the first elasticity element 1423B and a deformation of the second elasticity element 1623B to convert output forces, respectively.

In the second embodiment of the joint exoskeleton auxiliary driving mechanism 1B, the first connecting member 12B has a supporting member 122B. The supporting member 122B is disposed on the first connecting member 12B and faces the first motion assembly 15B. The supporting member 122B has a first pivoting portion 123B and a second pivoting portion 124B. The first pivoting portion 123B and the second pivoting portion 124B are disposed at a spaced interval. The first connecting member 12B is connected to the first motion assembly 15B by the first pivoting portion 123B and the second pivoting portion 124B of the supporting member 122B.

The first motion assembly 15B is connected to the first power output element 143B of the first linear driver 14B. The first motion assembly 15B has a first motion rod assembly 154B, a second motion rod assembly 155B, and a first motion member 156B. The first motion rod assembly 154B is connected to the first power output element 143B. The first motion rod assembly 154B has a first motion rod 1541B and a second motion rod 1542B. An end of the first motion rod 1541B is rotatably disposed on the first power output element 143B. An end of the second motion rod 1542B is connected to the second pivoting portion 124B of the supporting member 122B. The second motion rod 1542B has a pivoting section 15421B facing the second pivoting portion 124B. The pivoting section 15421B is rotatably connected to another end of the first motion rod 1541B. The second motion rod 1542B has a first motion end portion 1543B formed on another end of the second motion rod 1542B relative to the second pivoting portion 124B.

The second motion rod assembly 155B is connected to the second power output element 163B. The second motion rod assembly 155B has a first motion element 1551B, a second motion element 1552B, and a third motion element 1553B. An end of the first motion element 1551B is rotatably disposed on the second power output element 163B. An end of the second motion element 1552B is connected to the first pivoting portion 123B of the supporting member 122B. The second motion element 1552B has a connecting section 15521B located beside the second pivoting portion 124B. Another end of the first motion element 1551B is rotatably connected to the connecting section 15521B of the second motion element 1552B. An end of the third motion element 1553B is rotatably connected to another end of the second motion element 1552B. The third motion element 1553B has a second motion end portion 1554B. The second motion end portion 1554B is formed on another end of the third motion element 1553B relative to the second motion element 1552B.

The first motion member 156B has a first motion pivoting portion 1561B and a second motion pivoting portion 1562B. The first motion pivoting portion 1561B and the second motion pivoting portion 1562B are respectively located at two opposite sides of the first motion member 156B. The first motion pivoting portion 1561B is rotatably connected to the first motion end portion 1543B of the first motion rod assembly 154B. The second motion pivoting portion 1562B is rotatably connected to the second motion end portion 1554B of the second motion rod assembly 155B.

With reference to FIGS. 5 to 7, the first motion member 156B has a base 1563B, a first side plate 1564B, a second side plate 1565B, and an end plate 1566B. The first side plate 1564B and the second side plate 1565B are respectively disposed on two sides of the base 1563B relative to the first power output axial direction 1420B. The first motion pivoting portion 1561B is located at the first side plate 1564B. The end plate 1566B is formed on another end of the second side plate 1565B relative to the first motion pivoting portion 1561B and bendingly extends toward the first side plate 1564B. The second motion pivoting portion 1562B is located at the end plate 1566B.

Each one of the first side plate 1564B and the second side plate 1565B has a respective elongate hole 15641B, 15651B. A moving rod 1567B is disposed between the first side plate 1564B and the second side plate 1565B. Two ends of the moving rod 1567B are respectively inserted through the elongate hole 15641B of the first side plate 1564B and the elongate hole 15651B of the second side plate 1565B. Therefore, the first motion assembly 15B has a self-adapting adjusting function.

Figure 8:
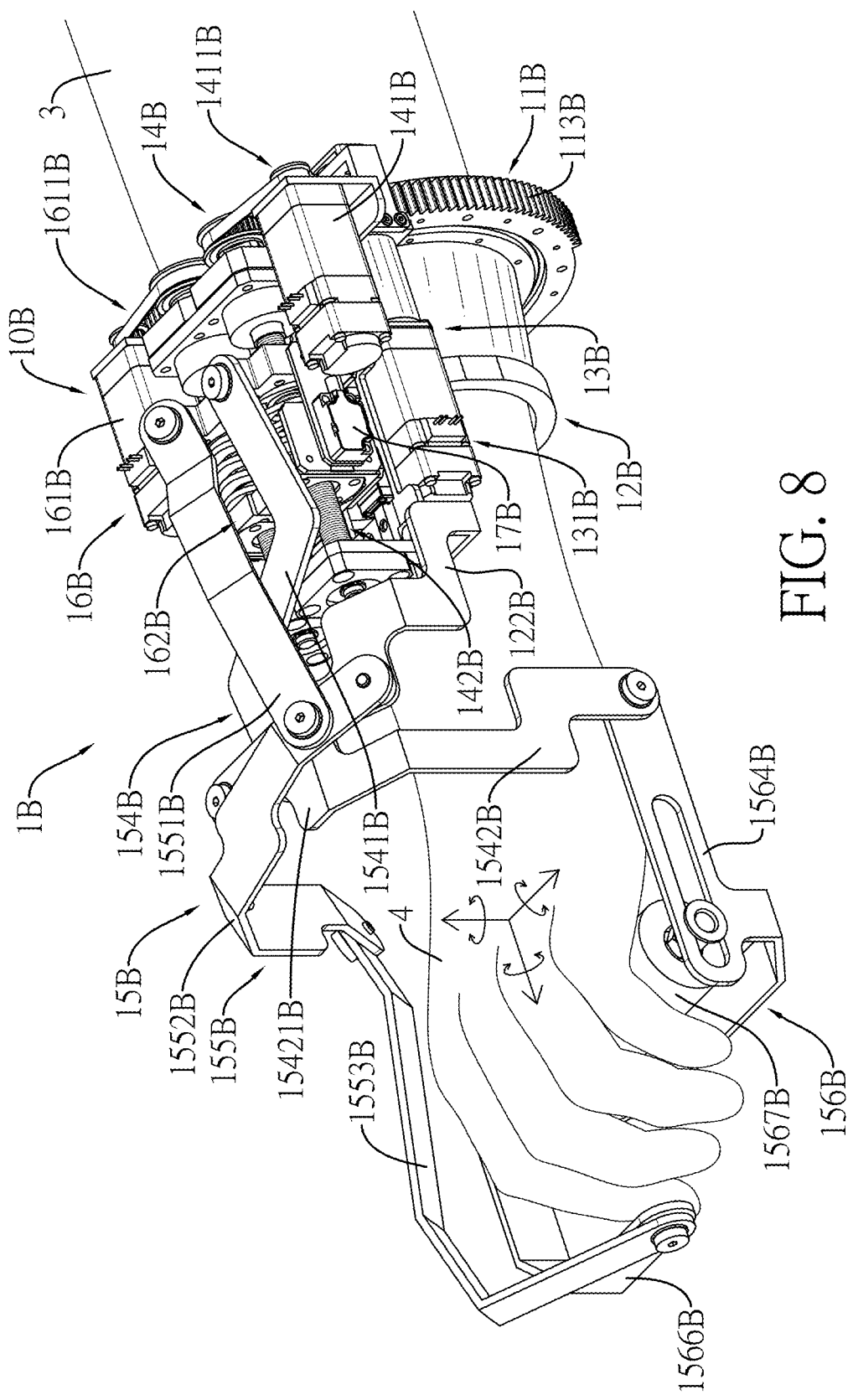
FIG. 8 is an operational perspective view of the joint exoskeleton auxiliary driving mechanism in FIG. 5, showing the joint exoskeleton auxiliary driving mechanism is applied to a wrist joint.

With reference to FIG. 8, the joint exoskeleton auxiliary driving mechanism 1B is applied to the wrist joint of the human body. The first connecting member 12B is disposed on a forearm 3 of the human body. The first motion assembly 15B is connected to a hand 4 of the human body. The first gear member 11B engages with the first rotating driver 13B for driving the forearm 3 connected to the wrist joint to perform a pronation and a supination. An assembly about the first linear driver 14B and the second linear driver 16B connected to the first motion assembly 15B in parallel is disposed on the first connecting member 12B for driving the hand 4 connected to the wrist joint to perform an ulnar deviation or a radial deviation, and a dorsiflexion or an extension.

Furthermore, the first motion assembly 15B combines the first motion rod assembly 154B, the second motion rod assembly 155B, and the first motion member 156B. The first motion rod assembly 154B and the second motion rod assembly 155B are an assembly with many components for increasing the action flexibility of the wrist joint. The two displacement sensors 17B can respectively sense the deformation of the first elasticity element 1423B of the first linear driver 14B and the deformation of the second elasticity element 1623B of the second linear driver 16B to convert the output force. The first torsion spring 133B is connected between the first driving rod and the first driving gear 132B of the first rotating driving motor assembly 131B. The first angle sensor 134B can sense the rotating deformation of the first driving gear 132B to convert the output torque of the first rotating driver 13B. Strength of the joint exoskeleton auxiliary driving mechanism 1B can be controlled precisely.

Figure 10:
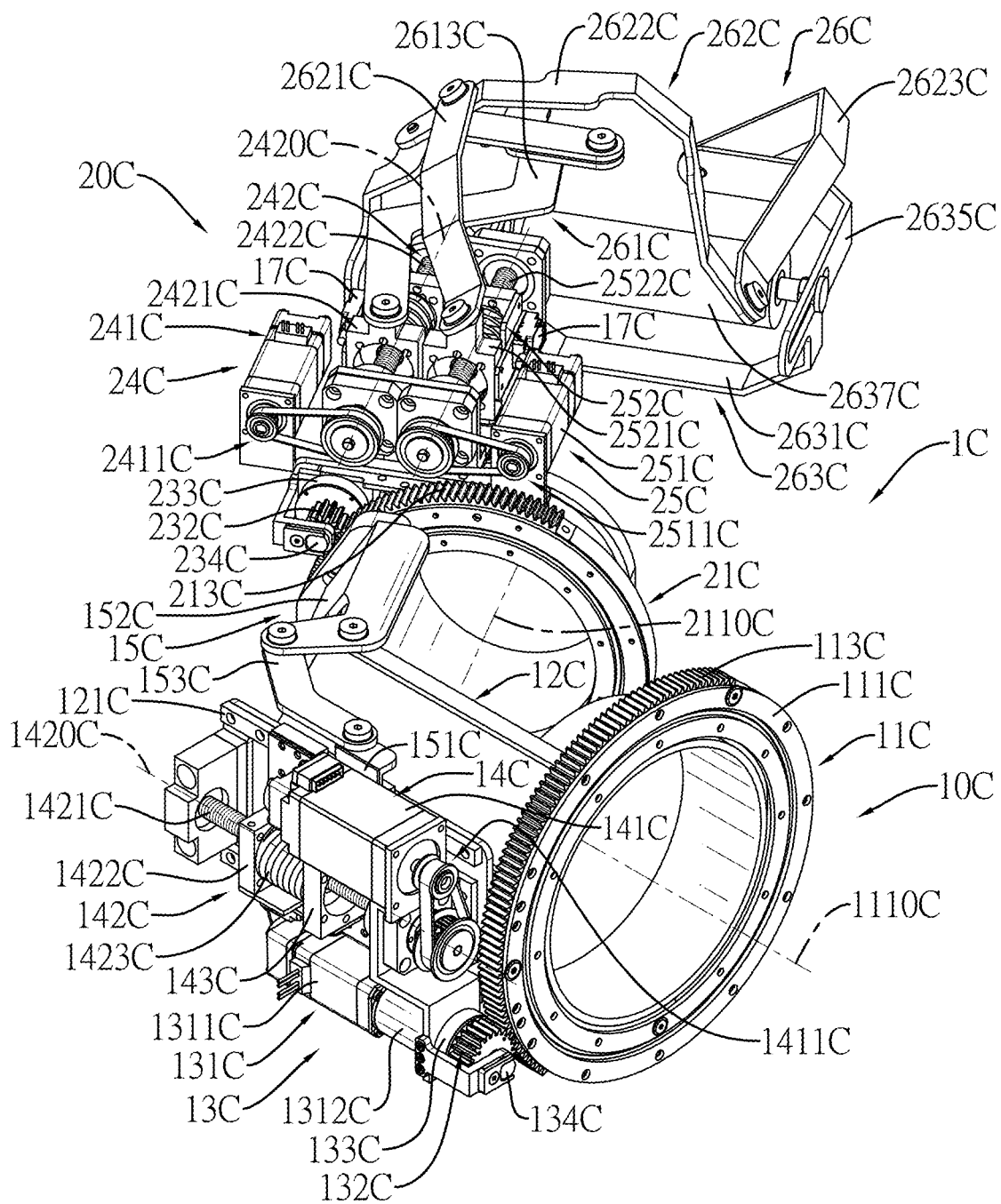
FIG. 10 is another perspective view of the joint exoskeleton auxiliary driving mechanism in FIG. 9.
Figure 11:
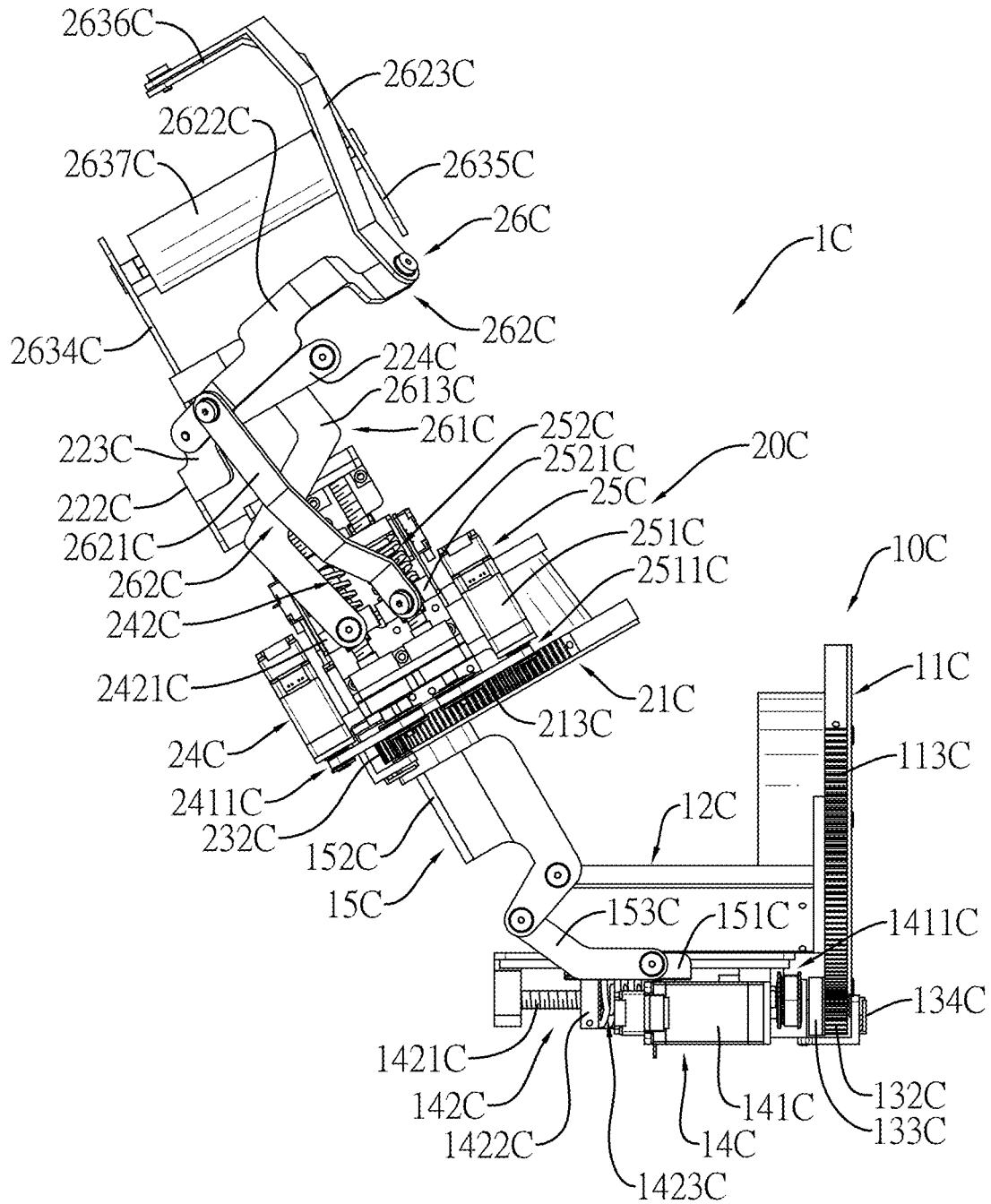
FIG. 11 is a top side view of the joint exoskeleton auxiliary driving mechanism in FIG. 9.

With reference to FIGS. 9 to 11, in a third embodiment of the joint exoskeleton auxiliary driving mechanism 1C in accordance with the present invention, the joint exoskeleton auxiliary driving mechanism 1C is applied to double joint portions between the elbow joint and the wrist joint or between the knee joint and the ankle joint in a human body, humanoid robot, rehabilitation robot, or prosthetic robot. The joint exoskeleton auxiliary driving mechanism 1C has a first driving module 10C and a second driving module 20C. Structure of the first driving module 10C in the third embodiment of the joint exoskeleton auxiliary driving mechanism 1C is same to the structure of the first driving module 10A having two degrees of freedom in the first embodiment of the joint exoskeleton auxiliary driving mechanism 1A. Structure of the second driving module 20C in the third embodiment of the joint exoskeleton auxiliary driving mechanism 1C is same to the structure of the first driving module 10B having three degrees of freedom in the second embodiment of the joint exoskeleton auxiliary driving mechanism 1A. Therefore, the third embodiment of the joint exoskeleton auxiliary driving mechanism 1C has five degrees of freedom. The structures of the first driving module 10C and the second driving module 20C are described as follows.

With reference to FIGS. 9 to 11, the first driving module 10C is a module having two degrees of freedom for providing driving functions such as dorsiflexion or extension, and outer rotation or inner rotation. The first driving module 10C has a first gear member 11C, a first connecting member 12C, a first rotating driver 13C, a first linear driver 14C, and a first motion assembly 15C.

With reference to FIGS. 9 to 11, the first gear member 11C has a side, a first gear ring 111C, and a first center axis 1110C defined in the first gear ring 111C. The first gear ring 111C has a first outer surface 112C and a first engaging portion 113C. The first outer surface 112C is formed around the first gear ring 111C. The first engaging portion 113C is formed on at least part of the first outer surface 112C.

The first connecting member 12C is disposed on the side of the first gear member 11C. The first connecting member 12C is able to rotate relative to the first center axis 1110C of the first gear member 11C.

The first rotating driver 13C is disposed on the first connecting member 12C. The first rotating driver 13C has a first rotating driving motor assembly 131C and a first driving gear 132C. The first rotating motor assembly 131C has a first driving rod. The first driving gear 132C is connected to the first driving rod and engages with the first engaging portion 113C of the first gear ring 111C.

The joint exoskeleton auxiliary driving mechanism 1C has a first torsion spring 133C and a first angle sensor 134C. The first torsion spring 133C is connected between the first rotating driving motor assembly 131C and the first driving gear 132C of the first rotating driver 13C. The first angle sensor 134C is disposed beside the first driving gear 132C for sensing a rotating deformation of the first driving gear 132C to convert an output torque of the first rotating driver 13C.

The first linear driver 14C is disposed on the first connecting member 12C. The first linear driver 14C has a first driving motor 141C and a first linear driving assembly 142C. The first driving motor 141C is disposed on the first connecting member 12C and is connected to the first linear driving assembly 142C. The first linear driving assembly 142C has the first power output axial direction 1420C and a first power output element 143C. The first power output axial direction 1420C is defined in the first linear driving assembly 142C. The first power output element 143C is able to move along the first power output axial direction 1420C.

With reference to FIGS. 9 to 11, the first motion assembly 15C is connected to the first power output element 143C of the first linear driver 14C. The first motion assembly 15C has a first motion element 151C, a second motion element 152C, and two first connecting rods 153C.

The first motion element 151C is disposed on the first connecting member 12C and is able to move along the first power output axial direction 1420C.

The second motion element 152C has a body 1521C and two connecting wings 1522C. The two connecting wings 1522C are disposed on an end of the body 1521C facing the first motion element 151C. The two connecting wings 1522C are coaxially and pivotally disposed on the first connecting member 12C. A back end of the body 1521C relative to the first motion element 151C is connected to a second gear member 21C.

In each first connecting rod 153C, one end of the first connecting rod 153C is pivotally disposed on a side of the first motion element 151C relative to the first power output axial direction 1420C. Another end of the first connecting rod 153C is pivotally disposed on a distal end of one of the two connecting wings 1522C opposite to the body 1521C.

The second driving module 20C is a module having three degrees of freedom for providing driving functions such as ulnar deviation or radial deviation, dorsiflexion or extension, and pronation or supination. The second driving module 20C has the second gear member 21C, a second connecting member 22C, a second rotating driver 23C, a second linear driver 24C, a third linear driver 25C, and a second motion assembly 26C.

The second gear member 21C is connected to the first motion assembly 15C of the first driving module 10C and has a side, a second gear ring 211C, and a second center axis 2110C defined in the second gear ring 211C. The second gear ring 211C is connected to another end of the first motion assembly 15C relative to the first power output element 151C. The second gear ring 211C has a second outer surface 212C and a second engaging portion 213C. The second outer surface 212C is formed around the second gear ring 211C. The second engaging portion 213C is formed on at least part of the second outer surface 212C.

The second connecting member 22C is disposed on the side of the second gear member 21C. The second connecting member 22C is able to rotate relative to the second center axis 2110C of the second gear member 21C. The second connecting member 22C has a supporting member 222C. The supporting member 222C is disposed on the side of the second connecting member 22C. The supporting member 222C has a first pivoting portion 223C and a second pivoting portion 224C. The first pivoting portion 223C and the second pivoting portion 224C are disposed at a spaced interval.

The second rotating driver 23C is disposed on the second connecting member 22 and has a second rotating driving motor assembly 231C and a second driving gear 232C. The second rotating motor assembly 231C has a driving motor and a deceleration gear set connected to the driving motor. The second rotating motor assembly 231C has a second driving rod. The second driving gear 232C is disposed around the second driving rod and engages with the second engaging portion 213C of the second gear ring 211C.

The joint exoskeleton auxiliary driving mechanism 1C has a second torsion spring 233C and a second angle sensor 234C. The second torsion spring 233C is connected between the second driving rod and the second driving gear 232C of the second rotating driving motor assembly 231C. The second angle sensor 234C is disposed beside the second driving gear 232C for sensing a rotating deformation of the second driving gear 232C to convert an output torque of the second rotating driver 23C.

The second linear driver 24C is disposed on the second connecting member 22C and has a second driving motor 241C and a second linear driving assembly 242C. The second driving motor 241C is disposed on the second connecting member 22C and is connected to the second linear driving assembly 242C. The second linear driving assembly 242C has a second power output axial direction 2420C and a second power output element 2421C. The second power output axial direction 2420C is defined in the second linear driving assembly 242C. The second power output element 2421C is able to move along the second power output axial direction 2420C.

The third linear driver 25C is disposed on the second connecting member 22C and has a third driving motor 251C and a third linear driving assembly 252C. The third driving motor 251C is disposed on the second connecting member 22C and is connected to the third linear driving assembly 252C. The third linear driving assembly 252C has a third power output element 2521C. The third power output element 2521C is able to move along the second power output axial direction 2420C.

The second motion assembly 26C is connected to the second power output element 2421C of the second linear driver 24C and the third power output element 2521C of the third linear driver 25C.

The second linear driving assembly 242C has a second screw 2422C, a second driven element 2423C, and a second elasticity element 2424C. The second screw 2422C is rotatably disposed on the second connecting member 22C along the second power output axial direction 2420C and is inserted through the second power output element 2421C. The second driven element 2423C has a second driven block and a second screw bushing. The second driven block is rotatably disposed on the second connecting member 22C along the second power output axial direction 2420C. The second screw bushing is disposed on the second driven block and is disposed around and engages with the second screw 2422C. The second elasticity element 2423C has a second spring. Two ends of the second spring are respectively connected to the second driven element 2423C and the second power output element 2421C. The second driving motor 241C is connected to the second screw 2422C by a second wheel train transmission assembly 2411C.

The third linear driving assembly 252C has a third screw 2522C, a third driven element 2523C, and a third elasticity element 2524C. The third screw 2522C is rotatably disposed on the second connecting member 22C along the second power output axial direction 2420C and is inserted through the third power output element 2521C. The third driven element 2523C has a third driven block and a third screw bushing. The third driven block is rotatably disposed on the second connecting member 22C along the second power output axial direction 2420C. The third screw bushing is disposed on the third driven block and is disposed around and engages with the third screw 2522C. The third elasticity element 2524C has a third spring. Two ends of the third spring are respectively connected to the third driven element 2523C and the third power output element 2521C. The third driving motor 251C is connected to the third screw 2522C by a third wheel train transmission assembly 2511C.

The second motion assembly 26C is connected to the second power output element 2421C of the second linear driver 24C and the third power output element 2521C of the third linear driver 25C. The second motion assembly 26C has a first motion rod assembly 261C, a second motion rod assembly 262C, and a first motion member 263C.

The first motion rod assembly 261C is connected to the second power output element 2421C. The first motion rod assembly 261C has a first motion rod 2611C and a second motion rod 2612C. An end of the first motion rod 2611C is rotatably disposed on the second power output element 2421C. An end of the second motion rod 2612C is connected to the second pivoting portion 224C of the supporting member 222C. The second motion rod 2612C has a pivoting section facing the second pivoting portion 224C. The pivoting section of the second motion rod 2612C is rotatably connected to another end of the first motion rod 2611C. The second motion rod 2612C has a first motion end portion 2613C formed on another end of the second motion rod 2612C relative to the second pivoting portion 224C.

The second motion rod assembly 262C is connected to the third power output element 2521C. The second motion rod assembly 262C has a first motion element 2621C, a second motion element 2622C, and a third motion element 2623C. An end of the first motion element 2621C is rotatably disposed on the third power output element 2521C. An end of the second motion element 2622C is connected to the first pivoting portion 223C of the supporting member 222C. The second motion element 2622C has a connecting section located beside the second pivoting portion 224C. Another end of the first motion element 2621C is rotatably connected to the connecting section of the second motion element 2622C. An end of the third motion element 2623C is rotatably connected to another end of the second motion element 2622C. The third motion element 2623C has a second motion end portion 2624C. The second motion end portion 2624C is formed on another end of the third motion element 2623C relative to the third power output element 2521C.

The first motion member 263C has a first motion pivoting portion 2631C and a second motion pivoting portion 2632C. The first motion pivoting portion 2631C and the second motion pivoting portion 2632C are located at two opposite sides of the first motion member 263C. The first motion pivoting portion 2631C is rotatably connected to the first motion end portion 2613C of the first motion rod assembly 261C. The second motion pivoting portion 2632C is rotatably connected to the second motion end portion 2624C of the second motion rod assembly 262C. The first motion member 263C has a base 2633C, a first side plate 2634C, a second side plate 2635C, and an end plate 2636C. The first side plate 2634C and the second side plate 2635C are disposed on two sides of the base 2633C relative to the second power output axial direction 2420C. The first motion pivoting portion 2631C is located at the first side plate 2634C. The end plate 2636C is formed on another end of the second side plate 2635C relative to the first motion pivoting portion 2631C and bendingly extends toward the first side plate 2634C. The second motion pivoting portion 2632C is located at the end plate 2636C.

The first side plate 2634C and the second side plate 2635C each have a respective elongate hole 26341C, 26351C. A moving rod 2637C is disposed between the first side plate 2634C and the second side plate 2635C. Two ends of the moving rod 2637C are respectively inserted through the elongate hole 26341C of the first side plate 2634C and the elongate hole 26351C of the second side plate 2635C. Therefore, the second motion assembly 26C has a self-adapting adjusting function.

The joint exoskeleton auxiliary driving mechanism 1C has three displacement sensors 17C. The displacement sensors 17C are respectively disposed on a side of the first elasticity element 1423C, a side of the second elasticity element 2424C, and a side of the third elasticity element 2524C for sensing a deformation of the first elasticity element 1423C, a deformation of the second elasticity element 2424C, and a deformation of the third elasticity element 2524C to convert output forces.

The first connecting member 12C has at least one first slide rail 121C. The at least one first slide rail 121C is disposed along the first power output axial direction 1420C. The first driven block 14221C and the first power output element 143C are respectively and slidably disposed on the at least one first slide rail 121C. The second connecting member 22C has at least two second slide rails. The at least two second slide rails are disposed along the second power output axial direction 2420C. The second driven block, the second power output element 2421C, the third driven block, and the third power output element 2521C are respectively and slidably disposed on the at least two second slide rails.

Figure 12:
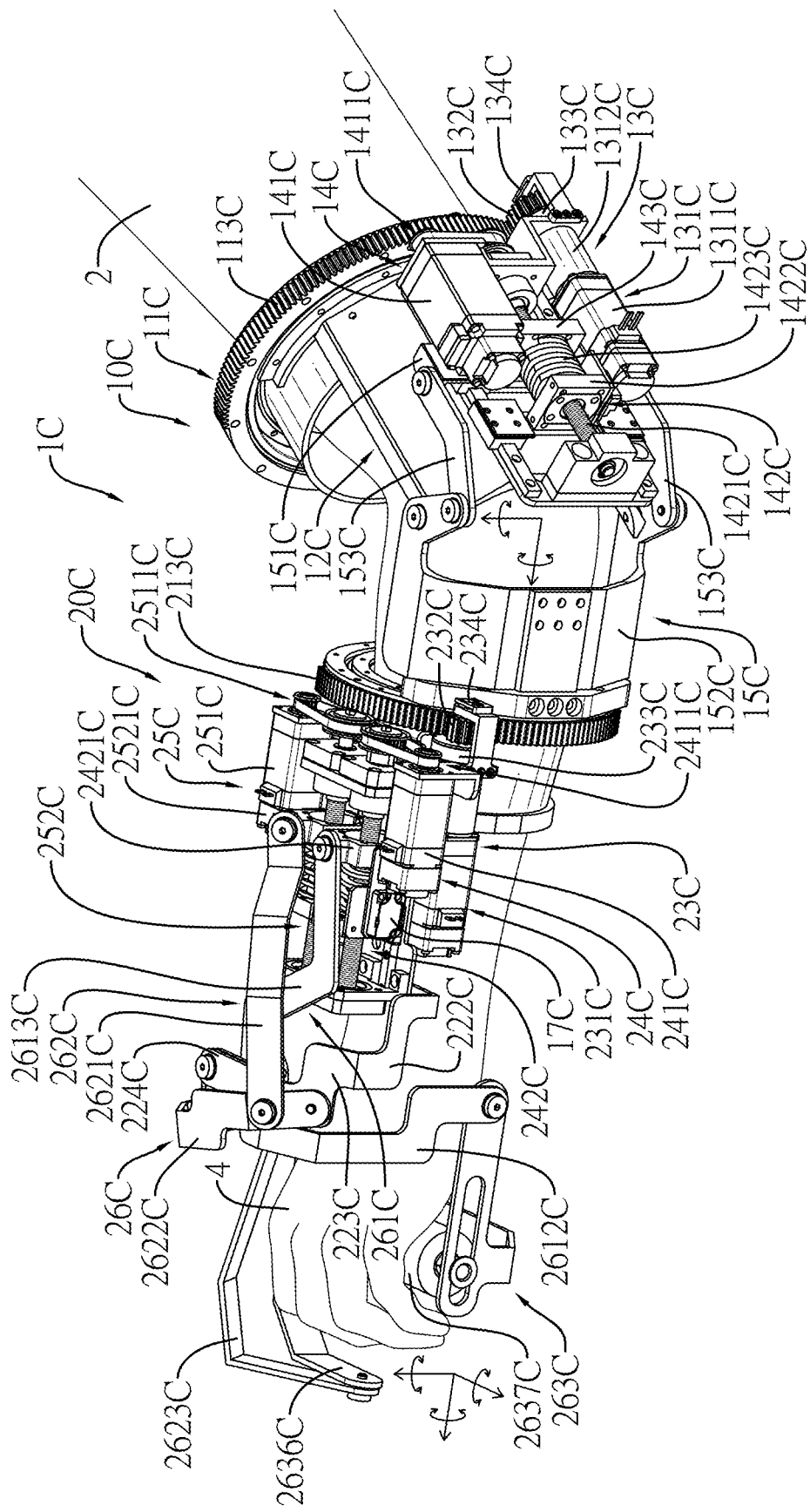
FIG. 12 is an operational perspective view of the joint exoskeleton auxiliary driving mechanism in FIG. 9, showing the joint exoskeleton auxiliary driving mechanism is applied to a double joint portion between an elbow joint and a wrist joint.
Figure 13:
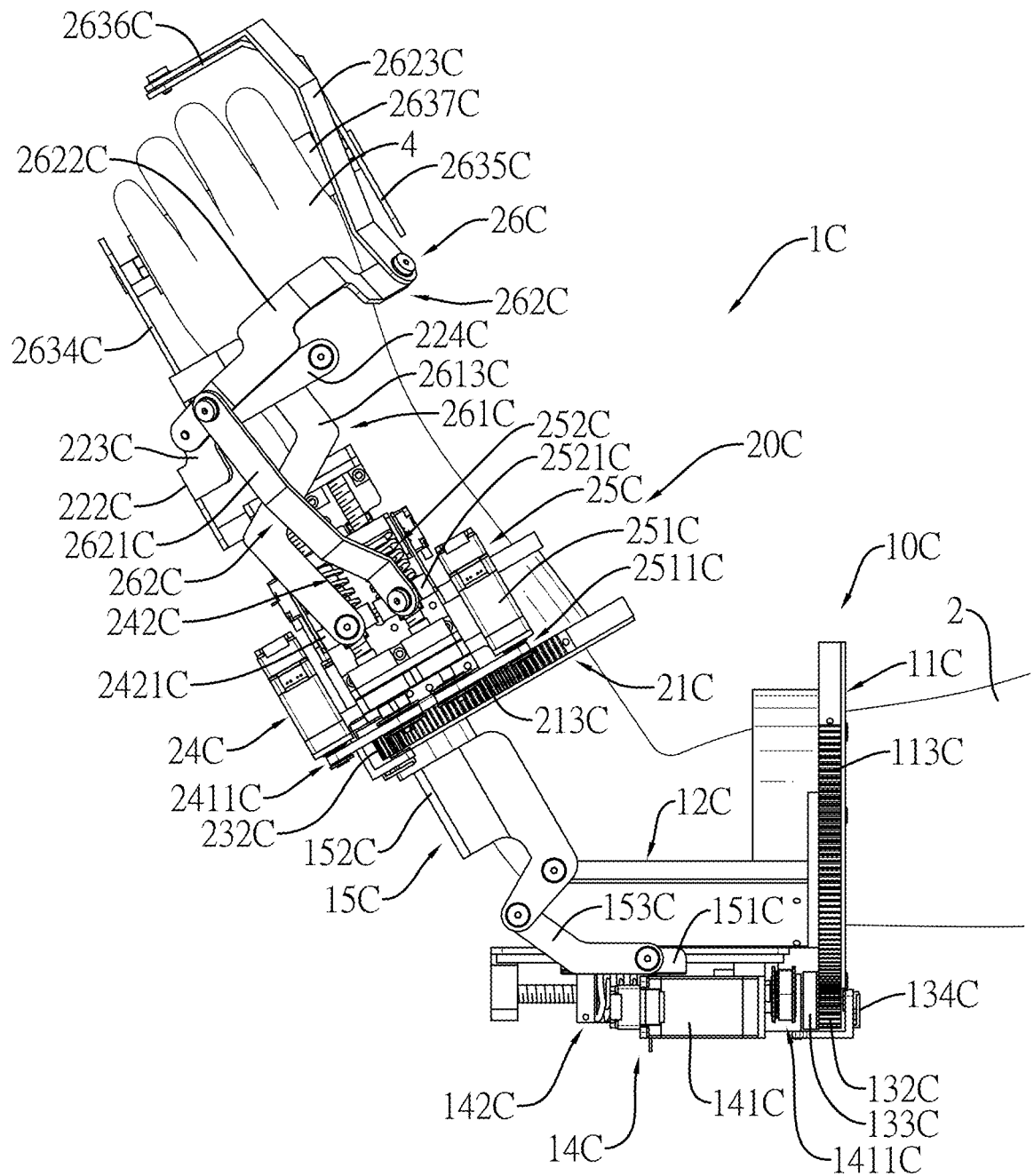
FIG. 13 is an operational top side view of the joint exoskeleton auxiliary driving mechanism in FIG. 9, showing the joint exoskeleton auxiliary driving mechanism is applied to a double joint portion between an elbow joint and a wrist joint.

With reference to FIGS. 12 and 13, the joint exoskeleton auxiliary driving mechanism 1C is applied to the double joint portion between the elbow joint and the wrist joint in a human body. The first connecting member 12C is disposed on an upper arm 2 of the human body. The first motion assembly 15C is connected to a forearm 3 of the human body. The first gear member 11C engages with the first rotating driver 13C for driving the forearm 3 connected to the elbow joint to achieve a motion function such as outer rotation and inner rotation. In addition, the first linear driver 14C and the first motion assembly 15C are assembled with each other and are disposed on the first connecting member 12C for driving the forearm 3 connected to the elbow joint to achieve a motion function such as dorsiflexion and extension. Furthermore, the second connecting member 22C of the second driving module 20C is connected to the first motion assembly 15C for connecting the forearm 3 of the human body. The second motion assembly 26C is connected to the hand of the human body. The second gear member 21C engages with the second rotating driver 23C for driving the wrist joint connected to the forearm 3 to achieve a motion function such as pronation and supination. In addition, an assembly about the second linear driver 24C and the third linear driver 25C are connected to the second motion assembly 26C in parallel is disposed on the second connecting member 22B for driving the hand 4 connected to the wrist joint to achieve an ulnar deviation or a radial deviation, and a dorsiflexion or an extension.

In the third embodiment of the joint exoskeleton auxiliary driving mechanism 1C, the first driving module 10C has two degrees of freedom such as dorsiflexion or extension, and outer rotation or inner rotation. The second driving module 20C has three degrees of freedom such as ulnar deviation or radial deviation, dorsiflexion or extension, and pronation or supination. The first driving module 10C is connected to the second driving module 20C in series to form a driving mechanism having five degrees of freedom. The joint exoskeleton auxiliary driving mechanism 1C can be applied to the double joint portion between the elbow joint and the wrist joint or between the knee joint and the ankle joint in a human body, rehabilitation robot, humanoid robot, or prosthetic robot. Furthermore, the first driving module 10C and the second driving module 20C both have a compact spatial configuration for decreasing size, decreasing weight, and increasing the action flexibility.

What is claimed is:

1. A joint exoskeleton auxiliary driving mechanism comprising:
    a first driving module having
        a first gear member having a side, a first gear ring, and a first center axis defined in the first gear ring, the first gear ring having a first outer surface and a first engaging portion, the first outer surface formed around the first gear ring, and the first engaging portion formed on at least part of the first outer surface;
        a first connecting member disposed on the side of the first gear member, wherein the first connecting member is able to rotate relative to the first center axis of the first gear member;
        a first rotating driver disposed on the first connecting member and having a first rotating driving motor assembly and a first driving gear, the first rotating motor assembly having a first driving rod, and the first driving gear disposed around the first driving rod and engaging with the first engaging portion of the first gear ring;
        a first linear driver disposed on the first connecting member and having a first driving motor and a first linear driving assembly, the first driving motor disposed on the first connecting member and connected to the first linear driving assembly, the first linear driving assembly having a first power output axial direction and a first power output element, the first power output axial direction defined in the first linear driving assembly, and the first power output element able to move along the first power output axial direction; and a first motion assembly connected to the first power output element of the first linear driver.

2. The joint exoskeleton auxiliary driving mechanism as claimed in claim 1, wherein the joint exoskeleton auxiliary driving mechanism has a displacement sensor, the displacement sensor is disposed on a side of the first elasticity element for sensing a deformation of the first elasticity element to convert an output force.

3. The joint exoskeleton auxiliary driving mechanism as claimed in claim 2, wherein the first connecting member has at least one first slide rail, the at least one first slide rail is disposed along the first power output axial direction, and the first driven block and the first power output element are respectively and slidably disposed on the at least one first slide rail.

4. The joint exoskeleton auxiliary driving mechanism as claimed in claim 2, wherein the joint exoskeleton auxiliary driving mechanism has a first torsion spring and a first angle sensor;

the first torsion spring is connected between the first driving rod and the first driving gear of the first rotating driving motor assembly; and the first angle sensor is disposed beside the first driving gear for sensing a rotating deformation of the first driving gear to convert an output torque of the first rotating driver.

5. The joint exoskeleton auxiliary driving mechanism as claimed in claim 1, wherein the joint exoskeleton auxiliary driving mechanism has a first torsion spring and a first angle sensor; the first torsion spring is connected between the first driving rod and the first driving gear of the first rotating driving motor assembly; and the first angle sensor is disposed beside the first driving gear for sensing a rotating deformation of the first driving gear to convert an output torque of the first rotating driver.

6. The joint exoskeleton auxiliary driving mechanism as claimed in claim 1, wherein the joint exoskeleton auxiliary driving mechanism has a second linear driver, the second linear driver is disposed on the first connecting member and has a second driving motor and a second linear driving assembly, the second driving motor is disposed on the first connecting member, the second linear driving assembly is connecting to the second driving motor and has a second power output element, and the second power output element is able to move along the first power output axial direction and is connected to the first motion assembly.

7. The joint exoskeleton auxiliary driving mechanism as claimed in claim 6, wherein the second linear driving assembly has a second screw, a second driven element, and a second elasticity element, the second screw is rotatably disposed on the first connecting member along the first power output axial direction and is inserted through the second power output element, the second driven element has a second driven block and a second screw bushing, the second driven block is disposed on the first connecting member for moving along the first power output axial direction, the second screw bushing is disposed in the second driven block and is disposed around the second screw, the second elasticity element has a second spring, two ends of the second spring are respectively connected to the second driven element and the second power output element, and the second driving motor is connected to the second screw by a second wheel train transmission assembly.

8. The joint exoskeleton auxiliary driving mechanism as claimed in claim 7, wherein the joint exoskeleton auxiliary driving mechanism has two displacement sensors, the displacement sensors are respectively disposed on a side of the first elasticity element and a side of the second elasticity element for sensing a deformation of the first elasticity element and a deformation of the second elasticity element to convert output forces.

9. The joint exoskeleton auxiliary driving mechanism as claimed in claim 8, wherein the first connecting member has at least one first slide rail, the at least one first slide rail is disposed along the first power output axial direction, and the first driven block, the first power output element, the second driven block, and the second power output element are respectively and slidably disposed on the at least one first slide rail.

10. The joint exoskeleton auxiliary driving mechanism as claimed in claim 8, wherein the joint exoskeleton auxiliary driving mechanism has a first torsion spring and a first angle sensor, the first torsion spring is connected between the first driving rod and the first driving gear of the first rotating driving motor assembly, and the first angle sensor is disposed beside the first driving gear for sensing a rotating deformation of the first driving gear to convert an output torque of the first rotating driver.

11. The joint exoskeleton auxiliary driving mechanism as claimed in claim 7, wherein the joint exoskeleton auxiliary driving mechanism has a first torsion spring and a first angle sensor, the first torsion spring is connected between the first driving rod and the first driving gear of the first rotating driving motor assembly, and the first angle sensor is disposed beside the first driving gear for sensing a rotating deformation of the first driving gear to convert an output torque of the first rotating driver.

12. The joint exoskeleton auxiliary driving mechanism as claimed in claim 7, wherein the first connecting member has a supporting member, the supporting member is disposed on the first connecting member and faces the first motion assembly, the supporting member has a first pivoting portion and a second pivoting portion, and the first pivoting portion and the second pivoting portion are disposed at a spaced interval; and the first motion assembly has a first motion rod assembly connected to the first power output element and having a first motion rod and a second motion rod, an end of the first motion rod rotatably disposed on the first power output element, an end of the second motion rod connected to the second pivoting portion of the supporting member, the second motion rod having a pivoting section facing the second pivoting portion, the pivoting section rotatably connected to another end of the first motion rod, and the second motion rod having a first motion end portion formed on another end of the second motion rod relative to the second pivoting portion;

a second motion rod assembly connected to the second power output element and having a first motion element, a second motion element, and a third motion element, an end of the first motion element rotatably disposed on the second power output element, an end of the second motion element connected to the first pivoting portion of the supporting member, the second motion element having a connecting section located beside the second pivoting portion, another end of the first motion element rotatably connected to the connecting section of the second motion element, an end of the third motion element rotatably connected to another end of the second motion element, the third motion element having a second motion end portion, and the second motion end portion formed on another end of the third motion element relative to the second motion element; and a first motion member having a first motion pivoting portion and a second motion pivoting portion located at two opposite sides of the first motion member, the first motion pivoting portion rotatably connected to the first motion end portion of the first motion rod assembly, and the second motion pivoting portion rotatably connected to the second motion end portion of the second motion rod assembly.

13. The joint exoskeleton auxiliary driving mechanism as claimed in claim 12, wherein the first motion member has a base, a first side plate, a second side plate, and an end plate, the first side plate and the second side plate are disposed on two sides of the base relative to the first power output axial direction, the first motion pivoting portion is located at the first side plate, the end plate is formed on another end of the second side plate relative to the first motion pivoting portion and bendingly extends toward the first side plate, and the second motion pivoting portion is located at the end plate.

14. The joint exoskeleton auxiliary driving mechanism as claimed in claim 13, wherein the first side plate and the second side plate each have a respective elongate hole, a moving rod is disposed between the first side plate and the second side plate, and two ends of the moving rod are respectively inserted through the elongate hole of the first side plate and the elongate hole of the second side plate.

15. The joint exoskeleton auxiliary driving mechanism as claimed in claim 6, wherein the first connecting member has a supporting member, the supporting member is disposed on the first connecting member and faces the first motion assembly, the supporting member has a first pivoting portion and a second pivoting portion, and the first pivoting portion and the second pivoting portion are disposed at a spaced interval; and the first motion assembly has a first motion rod assembly connected to the first power output element and having a first motion rod and a second motion rod, an end of the first motion rod rotatably disposed on the first power output element, an end of the second motion rod connected to the second pivoting portion of the supporting member, the second motion rod having a pivoting section facing the second pivoting portion, the pivoting section rotatably connected to another end of the first motion rod, and the second motion rod having a first motion end portion formed on another end of the second motion rod relative to the second pivoting portion;

a second motion rod assembly connected to the second power output element and having a first motion element, a second motion element, and a third motion element, an end of the first motion element rotatably disposed on the second power output element, an end of the second motion element connected to the first pivoting portion of the supporting member, the second motion element having a connecting section located beside the second pivoting portion, another end of the first motion element rotatably connected to the connecting section of the second motion element, an end of the third motion element rotatably connected to another end of the second motion element, the third motion element having a second motion end portion, and the second motion end portion formed on another end of the third motion element relative to the second motion element; and a first motion member having a first motion pivoting portion and a second motion pivoting portion located at two opposite sides of the first motion member, the first motion pivoting portion rotatably connected to the first motion end portion of the first motion rod assembly, and the second motion pivoting portion rotatably connected to the second motion end portion of the second motion rod assembly.

16. The joint exoskeleton auxiliary driving mechanism as claimed in claim 15, wherein the first motion member has a base, a first side plate, a second side plate, and an end plate, the first side plate and the second side plate are disposed on two sides of the base relative to the first power output axial direction, the first motion pivoting portion is located at the first side plate, the end plate is formed on another end of the second side plate relative to the first motion pivoting portion and bendingly extends toward the first side plate, and the second motion pivoting portion is located at the end plate.

17. The joint exoskeleton auxiliary driving mechanism as claimed in claim 16, wherein the first side plate and the second side plate each have a respective elongate hole, a moving rod is disposed between the first side plate and the second side plate, and two ends of the moving rod are respectively inserted through the elongate hole of the first side plate and the elongate hole of the second side plate.

* * * * *